UNITED STATES PATENT OFFICE.

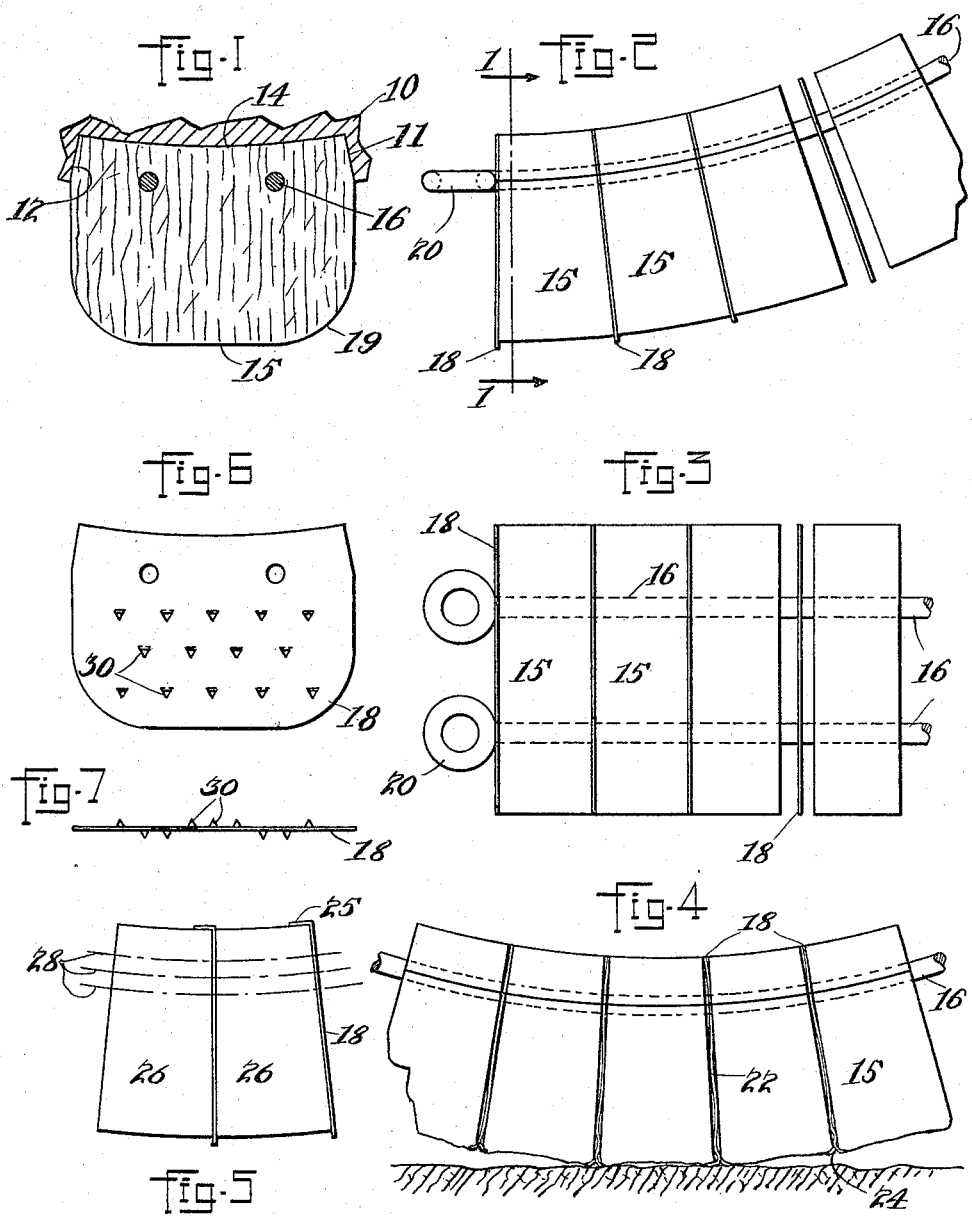

FRANK S. INGOLDSBY, OF PINE LAKE, MICHIGAN.

TREAD FOR TIRES.

1,176,295.    Specification of Letters Patent.    Patented Mar. 21, 1916.

Application filed July 18, 1914. Serial No. 851,690.

*To all whom it may concern:*

Be it known that I, FRANK S. INGOLDSBY, a citizen of the United States, residing at Pine Lake, in the county of Oakland and State of Michigan, have invented a certain new and useful Improvement in Treads for Tires, of which the following is a full, clear, and exact description, reference being had to the accompanying drawings.

This invention is for a tread for vehicle tires adapted to be used on the wheels of vehicles to deaden the noise and provide good traction.

An object of this invention is to provide such a tread which shall have the greatest possible strength and lasting qualities and which is adapted to prevent skidding.

My tread is composed of alternate blocks of wood, fiber, or like material, and metal plates.

Another object is to so arrange the blocks and plates as most securely to hold the blocks in position, while providing a tread which shall grip the roadbed in such a manner as to procure the best tractive hold.

A most valuable feature of my invention is that throughout the entire life of the tread the outer edges of the metal plates are being continually clenched into the outer edges of the blocks thus securing the blocks most effectively no matter how much the tread wears down.

A feature of my invention is that the plates shall wear away a trifle more slowly than the blocks, thereby providing the desirable projections for the tractive hold throughout the life of the tread.

Another feature of my tread is that as the metal members are worn and jammed inwardly, they separate the blocks, which tends to tighten them and thereby prevents loosening by wearing.

Still another object is to so construct the tread that it may be most cheaply manufactured and easily assembled to the wheel.

My invention is hereinafter more fully described in connection with the drawings and the essential characteristics are set forth in the claims.

In the drawings Figure 1 is a transverse section through a rim member having an annular recess to receive the tread and showing one block of the tread in position; Fig. 2 is a side elevation of a series of alternate blocks and plates strung on retaining wires; Fig. 3 is a plan of the same; Fig. 4 is a side elevation of the tread showing its condition after use; Fig. 5 is a side elevation of a modified form of alternate blocks and metal members; Fig. 6 is a side elevation and Fig. 7 is an edge view of a modified form of plates to be used between the blocks.

Referring to the drawings by reference numerals, 10 indicates a rim member suitably mounted on or forming a part of the wheel of the vehicle, having an annular recess 11 preferably provided with slightly flaring sides 12 and a crowned base 14.

15 indicates the blocks forming the greater part of the tread, which may be strung onto wires 16, of which there may be any convenient number, two being shown. Between these blocks are provided thin metal plates 18. These blocks and plates are shown as substantially rectangular in cross section, having rounded outer corners 19 and having their inner faces and sides shaped to conform to the recess in the rim of the vehicle wheel. The adjacent sides of the blocks are made radial so that they may fit snugly against the metal members, thus forming a rigid tread.

In the form shown in Figs. 1 to 4, each block and plate is provided with holes for threading the same onto circumferential wires 16. These wires are provided with eyes 20 at their ends, for securing the tread in position by suitable means. There may be a suitable distance piece between the eyes and the rim, and the eyes may be surmounted by a suitable block having a contour similar to that of the other blocks.

The metal plates 18 (of which there may be one or more between adjacent blocks) come to or project above the surface of the blocks to engage the roadway. If they come to the surface of the blocks they act like a hard grain and but little wear of the softer blocks is required to make a ridged periphery improving traction, or if they project above the surface of the blocks the ridged periphery exists before the tread is worn at all, and thus an improved traction is secured with either form.

The outer edges of these metal plates, whether projecting or flush, will become jammed and clenched into the outer edges of the blocks, as at 24, Fig. 4, by wear against the roadway, thereby insuring the blocks being securely held in position no matter how much the tread wears down.

This is particularly desirable when wooden blocks are used, as they are preferably arranged so that the wear comes on the end of the grain of the wood. In this position the blocks might be occasionally pulled from the wires or other securing means, but for the clenched or turned over edges of the plates engaging them. This jamming and clenching of the metal plates to secure the blocks, is an important feature of my invention. As the material of the blocks wears away more rapidly than the metal, the plates will always project above the blocks and thus present a ridged tread to procure the best tractive hold on the roadway, which is another important feature of my invention.

The action of the roadway on the edges of the plates besides clenching and jamming them will tend to buckle them as indicated at 22 in Fig. 4, which serves to tighten up the tread by separating the blocks throughout the entire periphery. This is one of the desirable features of my invention.

The blocks may comprise wood, fiber or suitable composition, it being desirable to provide a material which will deaden the noise made by the metal, while allowing particles of grit, etc., to adhere to the periphery, thereby increasing the tractive hold and tending to prevent skidding. By dipping the blocks in some preparation, such as tar, oil or other material acting not only to preserve the blocks but to cause them to adhere tightly to the rim, more life may be added to the tread and it may be more securely held in position.

In Fig. 5 is shown a modification in which the wires 16 are not used, but in which the blocks may be held in position by any suitable means, such for example, as grooving the sides thereof (as indicated by broken lines 28) and engaging them with flanges on the wheel projecting into such grooves. Whether or not the wires are employed, the metal plates may be additionally secured in position by bending them over sharply as at 25, at their inner edges, to engage beneath the separate blocks 26, corresponding to the blocks 15.

In Figs. 6 and 7 is shown a modified form of metal plate which has short sharp projections 30 extending from the sides thereof and integral therewith. These projections engage the material of the blocks to provide additional securing means for the blocks.

It will be seen from the foregoing description that I have provided a tire tread accomplishing the above objects, which not only gives a good traction, obviating the use of chains under many conditions, but such tread may be cheaply manufactured, the blocks being made for instance from small pieces and scrap blocks of wood, while the metal members may be readily stamped by suitable machinery, and the assembling of the tread onto the wires or other means may also be easily accomplished. When the wires are used they are preferably galvanized to prevent them rusting.

Having thus described my invention, what I claim is:

1. A tread for vehicle wheels comprising a series of blocks adapted to be mounted on the rim of a wheel, and metal members between adjacent blocks extending to the surface of the blocks to engage the roadway and having their outer edges projecting beyond and adapted to be bent to engage the edges of the blocks.

2. A tread for vehicle wheels comprising a series of blocks having substantially radial adjacent sides whereby they may be arranged in an annulus, metal members between such blocks extending beyond said blocks and adapted to have their ends bent to engage the outer edges of the same, said blocks and plates having holes therethrough for the reception of wires on which they may be strung.

3. A tread for vehicle wheels comprising a series of blocks adapted to be mounted on the rim of a wheel, and thin members between adjacent blocks adapted to bear at their inner ends against the rim and extending substantially beyond the tractive surface of the blocks and adapted to have their ends bent by engagement with the roadway.

4. A tread for vehicle wheels comprising a series of blocks arranged in an annulus about the rim of a wheel and having substantially radial adjacent surfaces and comparatively thin sheet metal transverse intervening plates adapted to bear at their inner ends against the rim and extending substantially beyond the tractive surface of the blocks and adapted to be bent in use to overlap the corners of the blocks.

In testimony whereof, I hereunto affix my signature in the presence of two witnesses.

FRANK S. INGOLDSBY.

Witnesses:
 FLOYD B. BABCOCK,
 STANLEY C. ROGERS.

Copies of this patent may be obtained for five cents each, by addressing the "Commissioner of Patents, Washington, D. C."